(12) United States Patent
Barton

(10) Patent No.: US 6,340,135 B1
(45) Date of Patent: Jan. 22, 2002

(54) TRANSLATING INDEPENDENTLY MOUNTED AIR INLET SYSTEM FOR AIRCRAFT TURBOFAN JET ENGINE

(75) Inventor: Brian E. Barton, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/580,900

(22) Filed: May 30, 2000

(51) Int. Cl.$^7$ ............................................... B64D 29/00
(52) U.S. Cl. ...................................... 244/53 B; 244/54
(58) Field of Search ................................. 244/53 R, 54, 244/110 B, 129.4; 137/15.1, 15.2; 60/39.31, 226.1

(56) References Cited

U.S. PATENT DOCUMENTS

| | | | |
|---|---|---|---|
| 2,417,945 A | * 3/1947 | Parker | 244/54 |
| 3,067,968 A | * 12/1962 | Heppenstall | 244/110 B |
| 4,442,987 A | * 4/1984 | Legrand et al. | 244/110 B |
| 5,035,379 A | * 7/1991 | Hersen et al. | 244/53 R |
| 5,609,313 A | * 3/1997 | Cole et al. | 244/54 |
| 6,179,249 B1 | * 1/2001 | Canadas | 244/53 R |

* cited by examiner

Primary Examiner—Galen L. Barefoot
(74) Attorney, Agent, or Firm—James M. Rashid; David M. Ronyak; Patrick J. Schlesinger

(57) ABSTRACT

An arrangement for an aircraft propulsion system to determinably reduce or eliminate inlet cowl induced bending of a turbofan aircraft jet engine case during certain flight conditions. The arrangement includes a turbofan aircraft jet engine having an engine case with a fan case portion, a nacelle structure housing the engine and having a forward nacelle portion and a rearward nacelle portion, and a pylon structure to support the engine and the nacelle structure while permitting the forward nacelle structure to be translated forwardly from an operational position to a servicing position to permit access to the engine and its components. The forward nacelle portion is independently supported from the pylon and has an inner skin portion that sealingly engages the fan case portion of the engine case and an outer skin portion that is determinably locked to the rearward nacelle portion. The sealing arrangement of the forward nacelle portion and the fan case portion is designed to determinably tailor the load transfer between the forward nacelle portion and the fan case portion to completely eliminate or to reduce such load transfer according to the particular propulsion system arrangement.

22 Claims, 8 Drawing Sheets

TRANSLATING INDEPENDENTLY MOUNTED AIR INLET SYSTEM FOR AIRCRAFT TURBOFAN JET ENGINE

BACKGROUND OF THE INVENTION

1. Field of the Invention

The present invention relates to an improvement in propulsion power systems for turbofan jet engines for aircraft and more particularly, but not by way of limitation, to an independently mounted translatable air inlet system for a turbofan aircraft jet engine.

2. Description of the Prior Art

The function of a nacelle for a turbofan jet engine for an aircraft is generally considered to be twofold. The nacelle must provide an air flow to the air intake of the engine with minimal disturbance for a variety of flight conditions which include high incidence, gusts, and the like. Also, the exterior profile of the nacelle should minimize aerodynamic drag, subject to constraints fail imposed by major engine components such as the accessories gearbox.

Considering the exterior profile of a nacelle, the skin friction component of the overall profile drag is directly affected by discontinuities on the outer surface. While the ideal would be for a smooth, uninterrupted outer surface, this ideal is compromised in nacelles previously proposed by the various breaks in the outer skin which arise due to split lines between the serially arranged nacelle components and to the doors and panels required to gain access to the equipment housed within.

While efforts have been made in the past to minimize discontinuities of the outer skin and to improve the exterior profile of a nacelle, it has been found that other aspects of nacelle construction may have a very significant effect upon the overall operation of the propulsion power system. Traditional turbofan air inlet and cowling arrangements of a nacelle consist of an inlet cowl secured to the fan casing of the engine with a direct bolted flange. This inlet cowl forms an internal aerodynamic source, which conditions the air for delivery to the engine fan and to the inlet of the engine itself It also forms the initial external aerodynamic surface, which smooths the airflow around the nacelle and systems associated with the fan case of the aircraft jet engine. An additional set of cowls form the remainder of the external aerodynamic source over the fan casing of the engine, and are split into two "C" shapes that are hinged from the aircraft pylon structure. Thus, a traditional high bypass turbofan aircraft engine nacelle system is considered to comprise an inlet cowl secured to the fan case of the engine, two C-shaped fan cowl portions secured to a pylon structure, a bifurcated thrust reverser portion secured to the engine body, and an exhaust cone and nozzle.

This traditional arrangement has three undesired effects which become increasingly more punitive as the size of the engine and resultant fan size increases. The first effect is the imposition of a bending moment on the fan case of the engine at certain flight conditions, particularly at take-off rotation, thereby leading to out-of-round distortion of the body of the engine giving rise to irregular blade tip rubs and loss of performance of the engine. The second effect is the need of increasingly stiff, and hence heavy, fan cowls to cope with intrinsic weight and wind gust loads when opened for required maintenance. The third effect is the reliance on the bolted attachment flange between the engine and the inlet cowl to retain the inlet cowl in the nacelle structure following a blade-out event.

The following patents, while of interest in the general field to which the present invention pertains, do not disclose the particular aspects of the invention that are of significant interest.

U.S. Pat. No. 5,609,313 issued on Mar. 11, 1997 to Cole et al discloses an aircraft propulsive power unit having a forward nacelle portion that is translatable fore and aft on side rails mounted on the exterior of the acoustic intake barrel that is secured to the engine fan case. Pins are provided to lock a nose lip portion of the forward nacelle portion to a flange located at the leading edge of the acoustic intake barrel.

U.S. Pat. No. 5,035,379 issued on Jul. 30, 1991 to Hersen et al discloses a movable cowling for an unducted aircraft turbine engine having a stationary fairing portion attached to an engine support pylon and a movable cowling portion. The movable cowling portion is provided with a slotted portion to accommodate a stationary fairing portion secured to the engine and to the pylon. A telescoping beam is attached to the engine and to the movable cowling portion to permit the cowling to be translated forwardly from a closed engine enclosing position to an open position to uncover the engine.

U.S. Pat. No. 5,941,061 issued on Aug. 24, 1999 to Sherry et al discloses an aircraft propulsive power unit having a bifurcated forward nacelle portion that is hingedly secured to an elongated pylon portion. The two piece forward nacelle portion is provided with a leading edge lipskin that cooperates with the forwardly extending end of an annular acoustic air inlet to provide an integral nose cowl and fan cowl portion when the bifurcated portions are lowered and locked into cooperation with the acoustic inlet.

U.S. Pat. No. 5,372,338 issued on Dec. 13, 1994 to Carlin discloses a nacelle of a gas turbine engine that is attached to an aircraft wing by a pylon. The nacelle is split horizontally to form a pair of opposing arcuate doors which are moveable between and open and closed positions. When the doors are closed a ring on the fan casing locates in a correspondingly shaped groove on the inner surface of the arcuate doors for the purpose of integrating the fan casing with the ring and sharing engine loads through the nacelle structure.

U.S. Pat. No. 5,603,471 issued Feb. 18, 1997 to Armstrong discloses a ducted fan turbine engine nozzle assembly. The thrust reverser portion of the nacelle and a portion of the discharge nozzle are integrated into a bifurcated door arrangement that is hinged to the pylon for pivoting movement between and an open position and a closed, operational position. Locators cooperate with the bifurcated doors to permit transmission of flight loads through the nacelle.

Although many such advances are noteworthy to one extent or another, none achieves the objectives of the present invention to provide an independently mounted translatable air inlet system for a turbofan aircraft jet engine.

It is a general object of this invention to provide an independently mounted translatable air inlet system for a turbofan aircraft jet engine that reduces the bending moment imposed on the fan case of the engine during certain flight conditions.

It is a further general object to reduce the weight and simplify the construction of an air inlet system for a turbofan aircraft jet engine.

It is a specific object of this invention to provide an independently mounted translatable air inlet system for a turbofan aircraft engine that provides a stable but flexible interface between the acoustically treated inner barrel of the inlet and the fan case of the engine.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

In accordance with the invention, an aircraft propulsion system arrangement is provided to reduce or eliminate inlet cowl induced bending of an aircraft jet engine case during certain flight conditions. This arrangement comprises a turbofan aircraft jet engine having an engine case with a fan case portion, a nacelle structure housing the engine and having a forward generally cylindrical nacelle portion and a rearward nacelle portion and a pylon structure to support the engine and the forward nacelle structure portion while permitting relative movement between the forward and rearward nacelle portions. The pylon structure supports the forward nacelle portion independently of its support of the engine while permitting translational movement of the forward nacelle portion on the pylon structure from a locked operational position during operation of the engine to a forward servicing position during non-operation of the engine. The forward nacelle portion provides an air inlet cowl portion directly coupled to the fan case portion of the engine for supply of air to the engine and a fan housing portion which surrounds the fan case portion of the engine. The forward nacelle portion includes a noselip portion having an inner main skin which extends rearwardly to sealingly engage the fan case portion of the engine and an outer generally concentric main skin which extends rearwardly to lockingly engage the rearward nacelle portion. In the forward servicing position of the forward nacelle portion it may be spaced forwardly from said fan case portion of the engine to uncover the outer fan case portion of the engine to give access to the engine and to components mounted on the engine which are inaccessible when the forward nacelle portion is secured in the operational position.

An extensible track arrangement is provided to permit determinable translation of the forward nacelle portion between a locked operational position during operation of the engine and a forward servicing position. A screw jack arrangement is determinably actuable to extend and retract the extensible track arrangement to translate the forward nacelle portion. Actuable locking means provide locking of the aft end of the outer skin of the forward nacelle portion to a forward flange means of the rearward nacelle portion. A suitable seal means such as a groove and blade arrangement provides a non-locking sealing and limited loading engagement between the aft end of the inner main skin of the forward nacelle portion and an annular flange provided on the fan case portion of the engine.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subjects of the claims of the invention. It should be appreciated by those skilled in the art that the conception and the disclosed specific embodiment may be readily utilized as a basis for modifying or design in other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE PREFERRED EMBODIMENT

Figure 1:
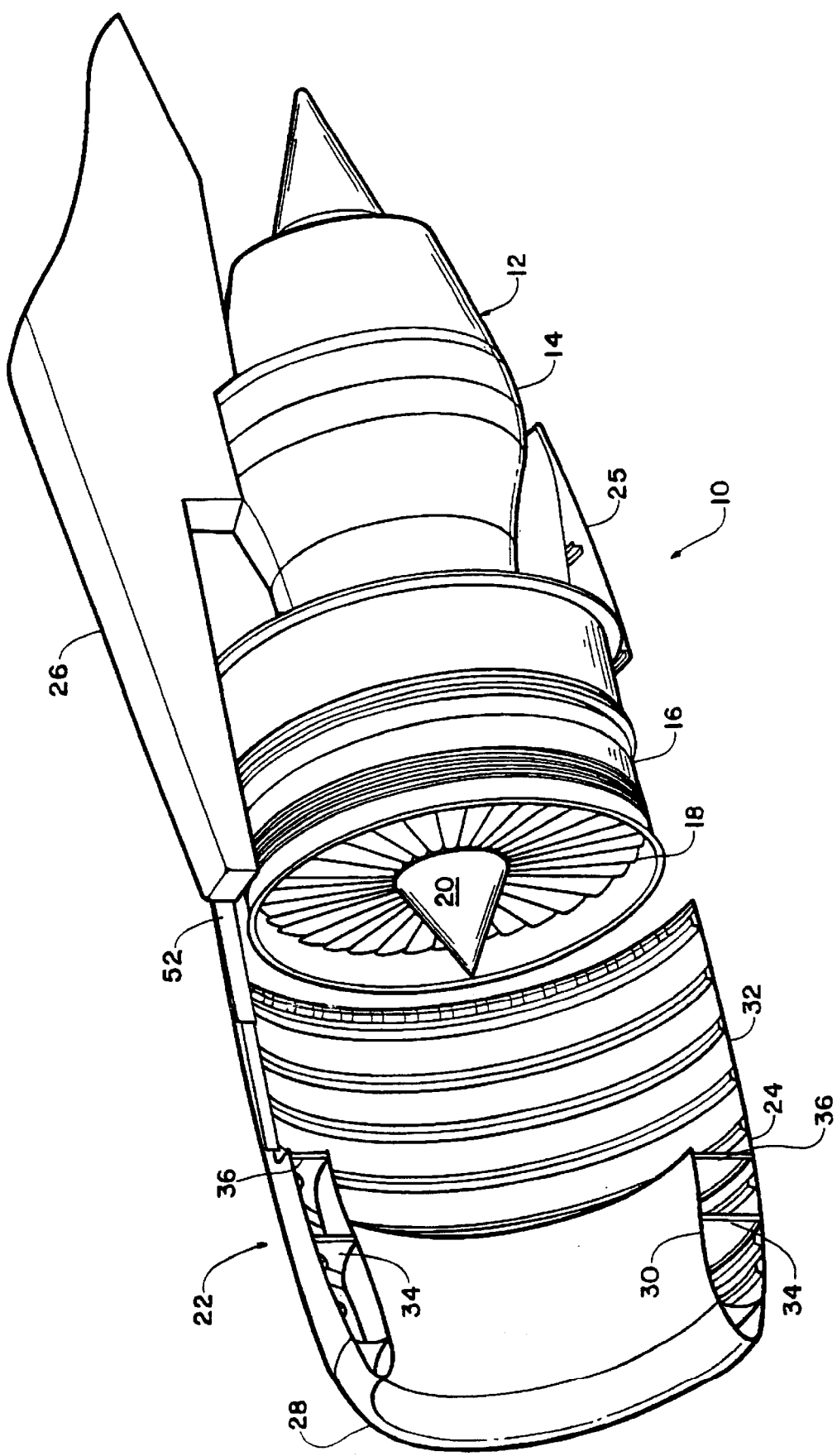
FIG. 1 is a simplified perspective, shown partially in section, of a translating independently mounted air inlet system for an aircraft turbofan jet engine constructed in accordance with a preferred embodiment of the present invention and shown in a forward servicing position.
Figure 2:
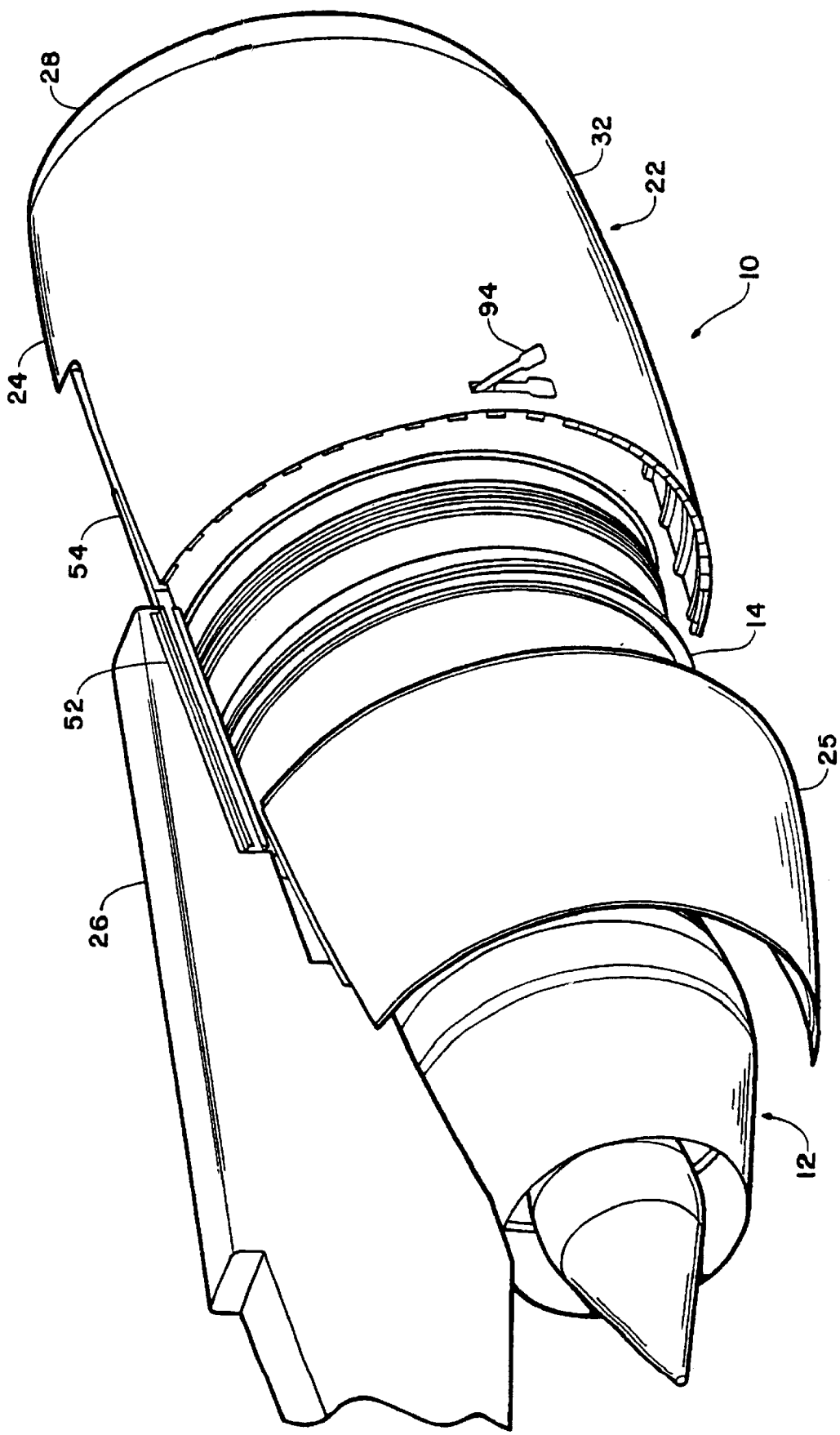
FIG. 2 is another simplified perspective, shown partially in section, of the air inlet system illustrated in FIG. 1.
Figure 3:
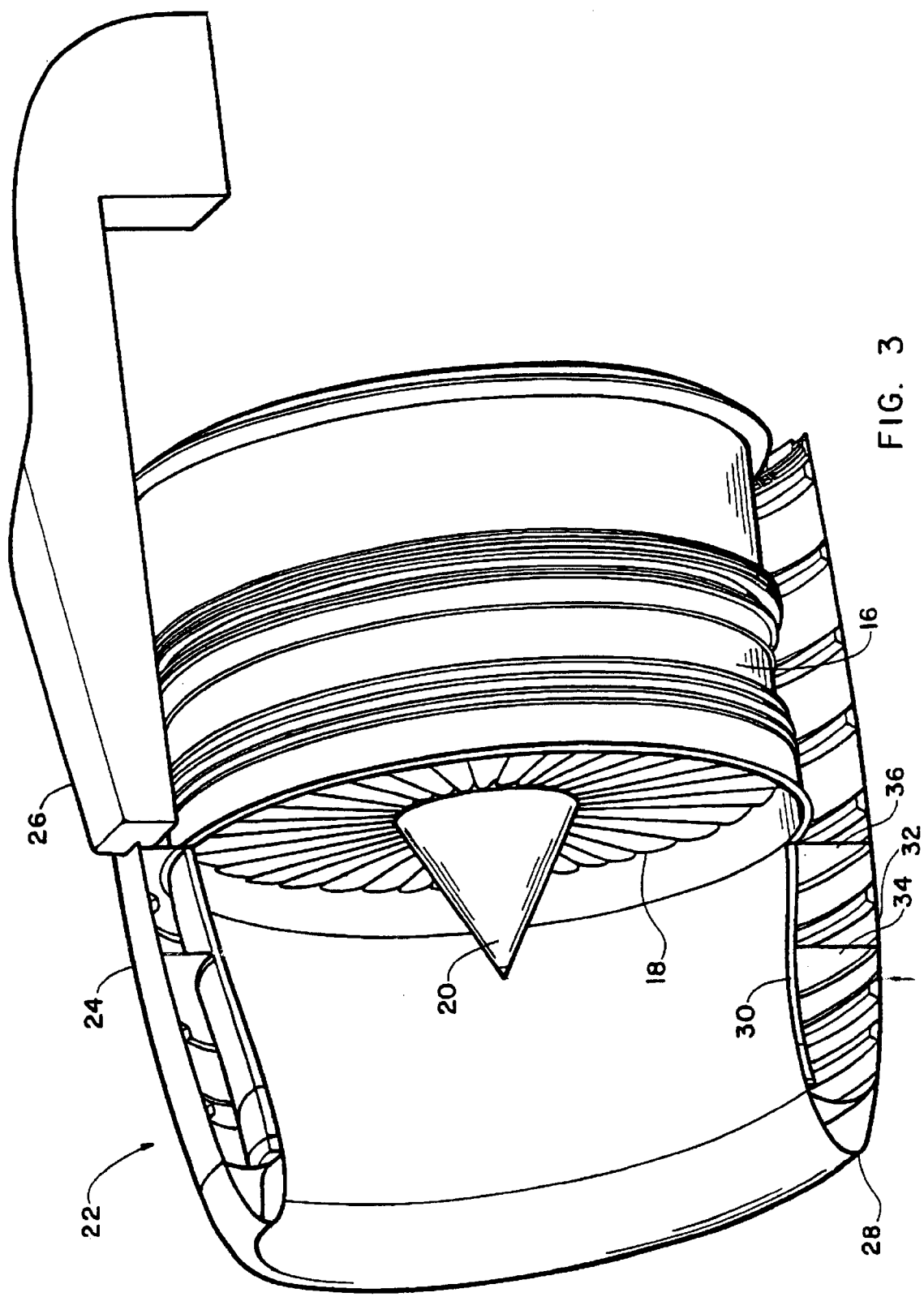
FIG. 3 is a simplified perspective, shown partially in section, of the air inlet system of FIGS. 1 and 2, shown in an operational position.

Referring now to the drawings in detail and in particular to FIGS. 1–3, reference character generally designates an aircraft propulsion system arranged to reduce or eliminate inlet cowl induced bending of an aircraft jet engine case during certain flight conditions that is constructed in accordance with a preferred embodiment of the present invention. The arrangement of the present invention comprises a high bypass turbofan aircraft jet engine 12 having an engine case 14 with a fan case portion 16. The components of the jet engine 12 are not shown as they are conventional except, as will be seen in FIGS. 1–3, the fan blades 18 and the spinner 20 are shown. A nacelle structure 22 houses the turbofan aircraft jet engine 12 and comprises a forward generally cylindrical nacelle portion 24 and a rearward nacelle portion 25. A pylon structure 26, secured to the wing (not shown) of an aircraft, supports the engine 12 and the nacelle structure 22 while permitting relative movement between the forward and rearward nacelle portions 24 and 25 respectively.

The pylon structure 26 supports the forward nacelle portion 24 independently of its support of the engine 12 while permitting translational movement of the forward nacelle portion 24 forwardly on the pylon from a locked operational position, as seen in FIG. 3, during operation of the engine 12 as in flight to a forward servicing position during non-operation of the engine 12, as seen in FIGS. 1 and 2. By supporting the forward nacelle portion 24 which forms the air inlet for the engine 12 independently of the engine case 14, the arrangement of the present invention reduces or eliminates inlet cowl induced bending of the engine case 14 during certain flight conditions.

The forward nacelle portion 24 provides an air inlet cowl portion that is directly coupled to the fan case portion 16 of the engine 12 for the supply of air to the engine 12 for combustion and to the bypass duct of the engine 12 that commences with the fan case portion 16 of the engine case 14. The forward nacelle portion 24 includes a noselip portion 28 having an inner main skin 30 which extends rearwardly to sealingly engage said fan case portion 16 in a limited load transfer arrangement as will be described in greater detail hereinafter. The noselip portion 28 also has an outer generally concentric main skin 32 which extends rearwardly to lockingly engage the rearward nacelle portion 25. The locking arrangement to secure the outer main skin 32 to the rearward nacelle portion 25 will also be described in detail hereinafter. A suitable bulkhead means such as the spaced bulkheads 34 and 36 may be positioned between the inner and outer main skins, 30 and 32, to provide reinforcement for the structure of the forward nacelle portion 24.

Thus, the forward nacelle portion 24 may be positioned on the pylon structure 26, as seen in FIG. 3, in a locked operational position during operation of the engine 12 as in flight. Alternatively, the forward nacelle portion 24 may be disengaged from locking engagement of the outer main skin 32 with the rearward nacelle portion 25 and translated forwardly to a desired forward servicing position, as seen in FIGS. 1 and 2, to uncover the fan case portion 16 of the engine 12 to give access thereto as may be desired and to give access to components (not shown) that are mounted on the engine 12 which are inaccessible for repair or maintenance purposes when the forward nacelle portion 24 is secured in the operational position.

As noted previously, an air inlet cowl of a turbofan aircraft engine is traditionally bolted directly to the fan casing of an engine with a direct bolted flange. Thus, since the air inlet cowl then, in effect, becomes an integral portion of the engine case the air inlet cowl imposes a bending moment on the fan case during certain flight conditions, particularly during take-off rotation of the aircraft, and leads to highly undesired effects such as out-of-round distortion of the engine case, irregular blade tip rubs of the fan blades against the fan casing and loss of performance of the engine. In the instance of the present invention, a limited load transfer is provided by the contact of the inner main skin 30 of the forward nacelle portion 24 with the fan case portion 16 of the fan case 14. In the preferred illustrated embodiment of the invention, shown most clearly in FIG. 4, this sealing and limited load transfer engagement takes the form of a flange 38 that is provided on the forward portion of the fan casing portion 16 of the engine case 14. The flange 38 is provided on its forward face with an inwardly extending annular groove 40 which is arranged to closely receive a longitudinally extending annular tongue portion 42 provided in a suitable annular flange member 44 that is suitably secured, as by rivets 46 to the main inner skin portion 30 of the forward nacelle portion 24.

Figure 4:
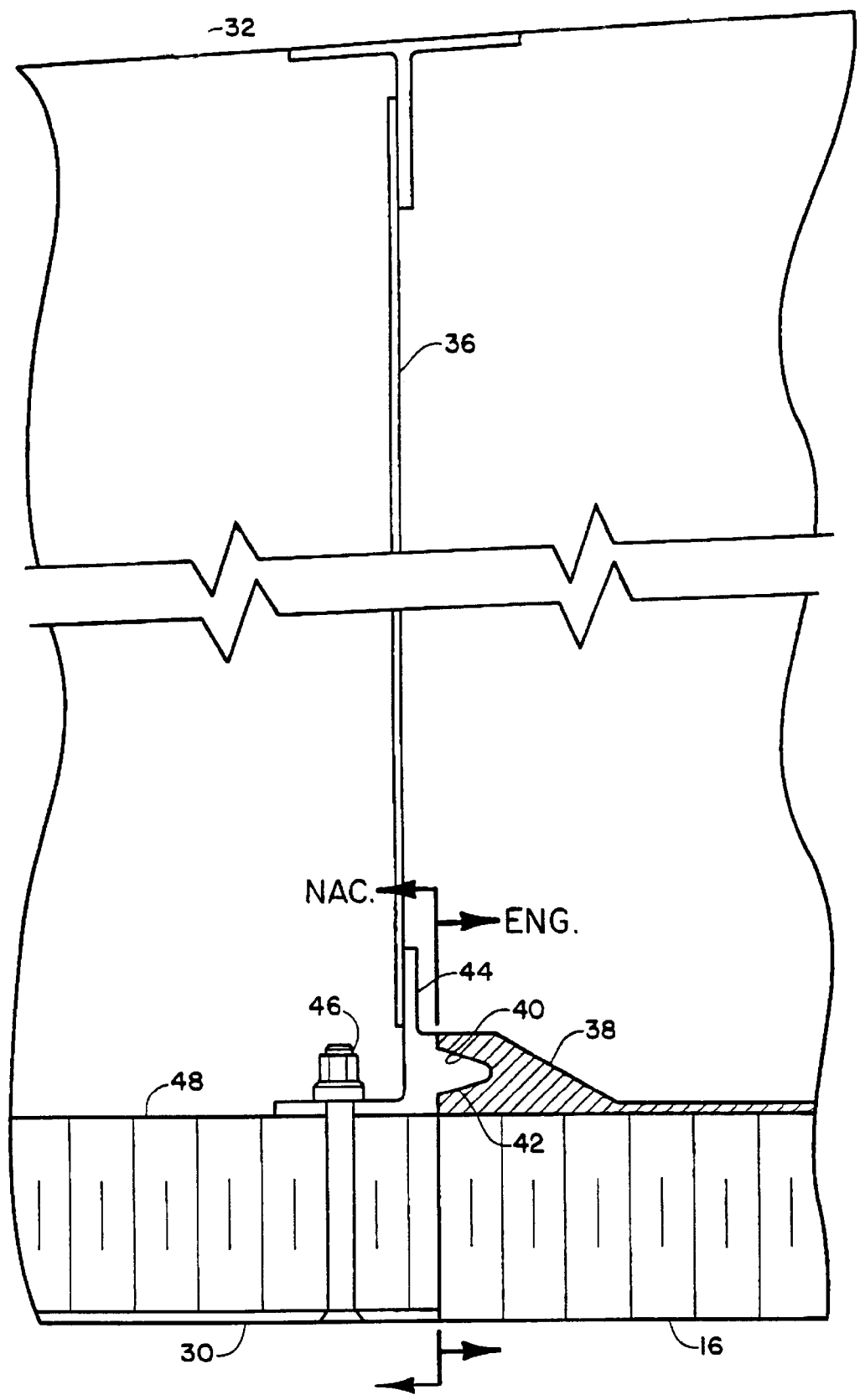
FIG. 4 is a detail of FIG. 1 and illustrates the engagement between the translating air inlet and the fan case portion of the engine.

It should be noted that the illustration of the main inner skin portion 30 in FIGS. 1 and 3 is seen to be a simplified diagrammatic one while the illustration of such skin 30 in FIG. 4 is a detailed view that more clearly depicts the sealing and limited load transfer engagement. Thus, the main skin 30 in FIG. 4 is illustrated as metallic honeycomb core panel 48 which has the flange 44 attached to its trailing edge portion. The V-shaped tongue portion 42 and the complementarily V-shaped groove portion 40 are sized to closely cooperate to preclude the leakage of air therebetween during flight conditions. While the illustrated sealing and limited load transfer engagement illustrated in FIG. 4 is presently preferred, it would be within the scope of the invention to provide other equivalent sealing and limited load transfer engagement expedients 1–5 between the trailing edge of the inner skin 30 and the leading edge portion of the fan casing 16. The arrangement provides for tailoring of the level of inlet bending load reduction through design and control of the stiffness of the forward nacelle structure 24 and the flexibility of the V-groove engagement. A soft seal at the engine interface and a rigid structure forward nacelle portion 24 combine to eliminate inlet bending loads from being transferred to the fan case 16. A more flexible nacelle structure 24 combined with a V-groove interface will reduce the transfer of inlet bending loads to the fan case 16. This reduction would be determinably variable depending on the relative stiffness of the nacelle and fan case structures and as would be desired for a particular propulsion system.

Referring again to FIGS. 1 and 2, a track means 50 is shown that provides support for the forward nacelle structure portion 24 and which permits determinable translation of the forward nacelle structure portion 24 from a locked operational position during operation to a forward servicing position during non-operation of the engine 12. A suitable track member 52 is suitably secured to the pylon structure 26 and slidably receives an extensible or telescoping member 54 that is suitably secured to the forward nacelle portion 24. The extensible member 54 may comprise a plurality of coaxially arranged track members 56 and 58, as seen in FIGS. 1, 2 and 7.

Preferably a track means 50 is provided on each side of pylon structure 26, as seen in the drawings. A suitable drive means is provided to determinable translate the forward nacelle structure 24 between an operational position and a forward servicing position. In the illustrated embodiment of the invention, this drive means takes the form of a suitable electrical motor 60 that is secured to the pylon structure 26 and which is provided with a rotatable screw jack 62 that is suitably secured to the forward nacelle portion 24 to provide for determinable desired translation of the forward nacelle portion 24. It is to be understood that when the aircraft, to which the pylon 26 is secured, is in a non-operating mode and it is desired to translate forwardly the forward nacelle portion 24 to a desired servicing position the drive motor 60 may be actuated to drive the forward nacelle portion 24 forwardly to a desired position to permit access to the engine 12 or components thereof for maintenance or other desired purposes.

Figure 6:
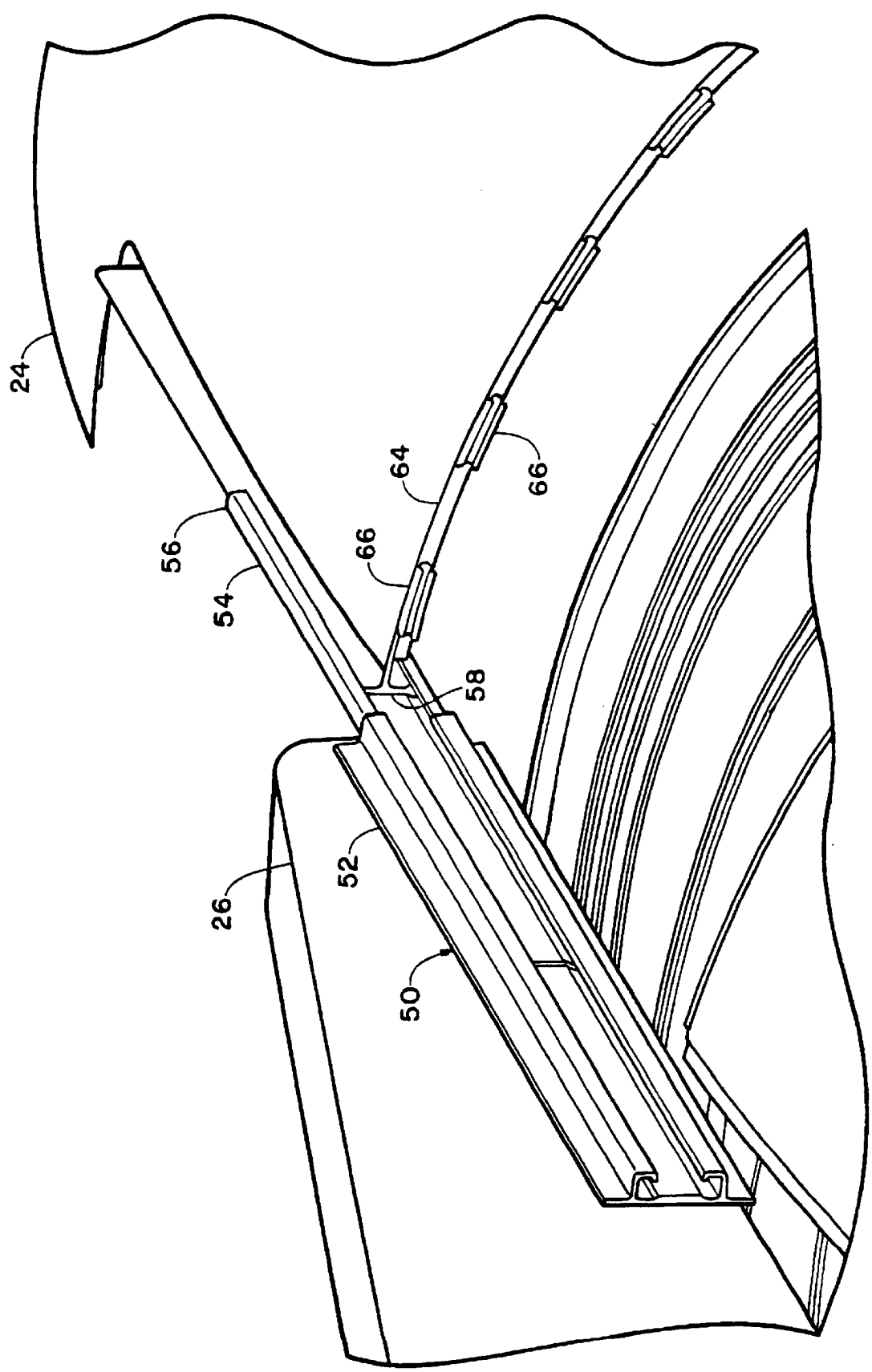
FIG. 6 is another simplified perspective illustrating the arrangement for supporting the inlet cowl during its translation.
Figure 7:
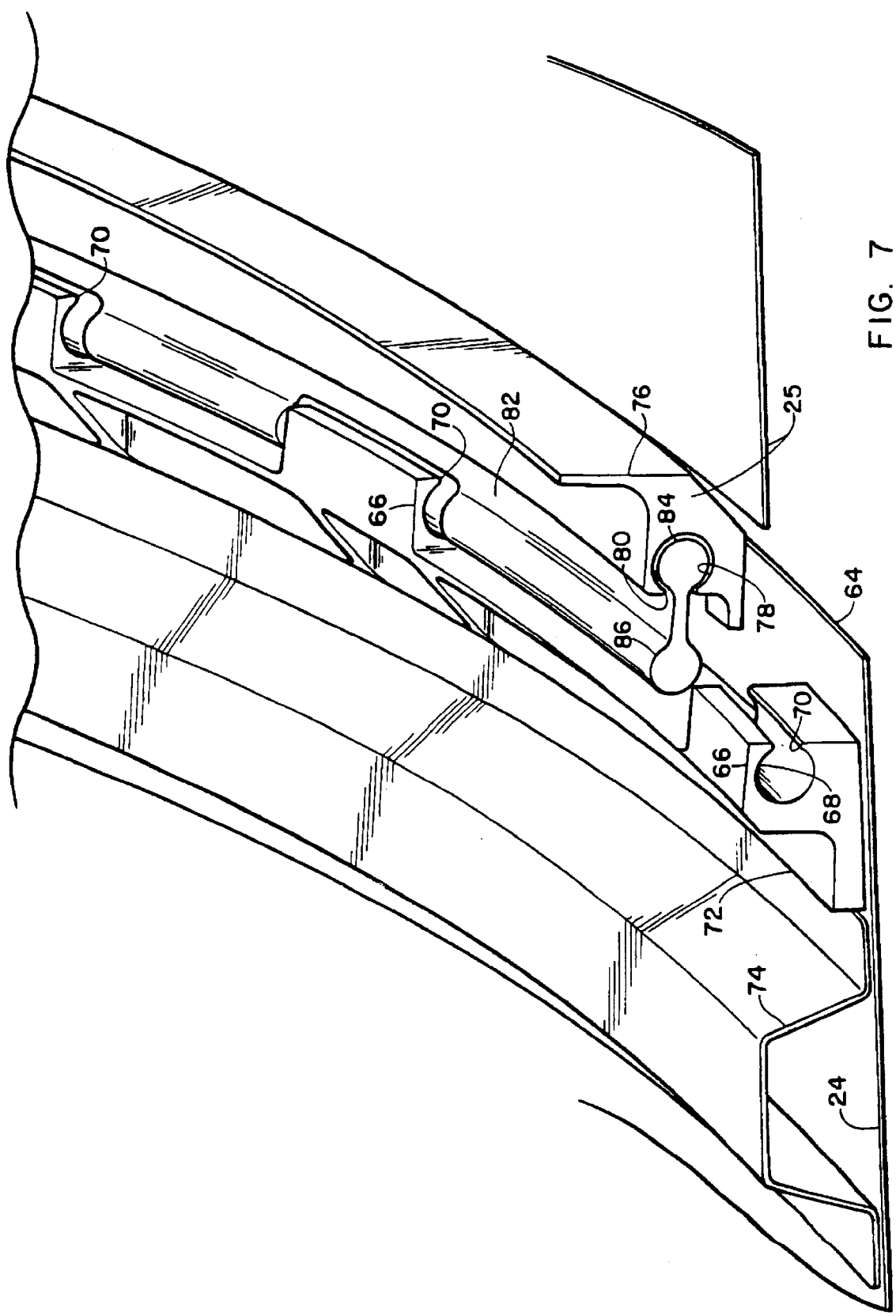
FIG. 7 is a simplified perspective illustrating the mechanism for locking the inlet cowl in an operational position.

Referring now to FIGS. 2 and 6–8, it will be seen how the outer generally concentric main skin 32 of the forward nacelle potion 24 releasably, lockingly engages the rearward non-translating nacelle portion 25 that is secured to the engine 12. In FIGS. 6 and 7, it is seen that the rearward or trailing edge 64 of the forward nacelle portion 24 is provided with a plurality of circumferentially spaced locking members 66, each member 66 being provided with a central cavity 68 having a rearwardly opening passage 70. The locking members 66 may be suitably secured to the trailing edge portion 64 of the translatable forward nacelle structure 24. Preferably the spaced locking members 66 are integrally formed with an annularly shaped locking flange 72 that is suitably secured to the trailing edge 64 of the forward nacelle portion 24 which may be provided with a suitably stiffening reinforcing member 74.

The rearward nacelle portion 25, which preferably comprises a suitable thrust reverser structure for the nacelle 22, is provided at its leading portion with a suitable annularly shaped locking flange member 76 that is suitably secured to the fixed nacelle portion 25. The locking flange member 76 is provided at its leading edge with a circumferentially extending annular cavity 78 that is provided with a forwardly extending passageway 80. A suitable circumferentially 43 extending curved locking ring 82 that is provided with a rearwardly extending annular circurferentially extending bulbous portion 84 that is slidingly received within the cavity 78 provided in the locking flange member 76.

The locking ring 82 is also provided with a plurality of forwardly extending circumferentially spaced bulbous portions 86 that are arranged to be slidably received withing the annular cavities 68 provided in the forward locking member 72. It will be appreciated that when the locking ring 82 has been slidably positioned, as seen in FIG. 7, that the each bulbous portion 86 has been circumferentially positioned to enable each bulbous portion 86 to clear the locking member 72 when the forward translating nacelle portion 24 is to be translated forwardly during non-operation of the engine 12. It will be appreciated that the locking ring 82 is slidably positioned in the unlocked position illustrated in FIG. 7 when it is desired to permit the forward nacelle portion 24 to be forwardly translated to a desired servicing position to permit desired servicing of the engine or any of the auxiliary components.

Figure 5:
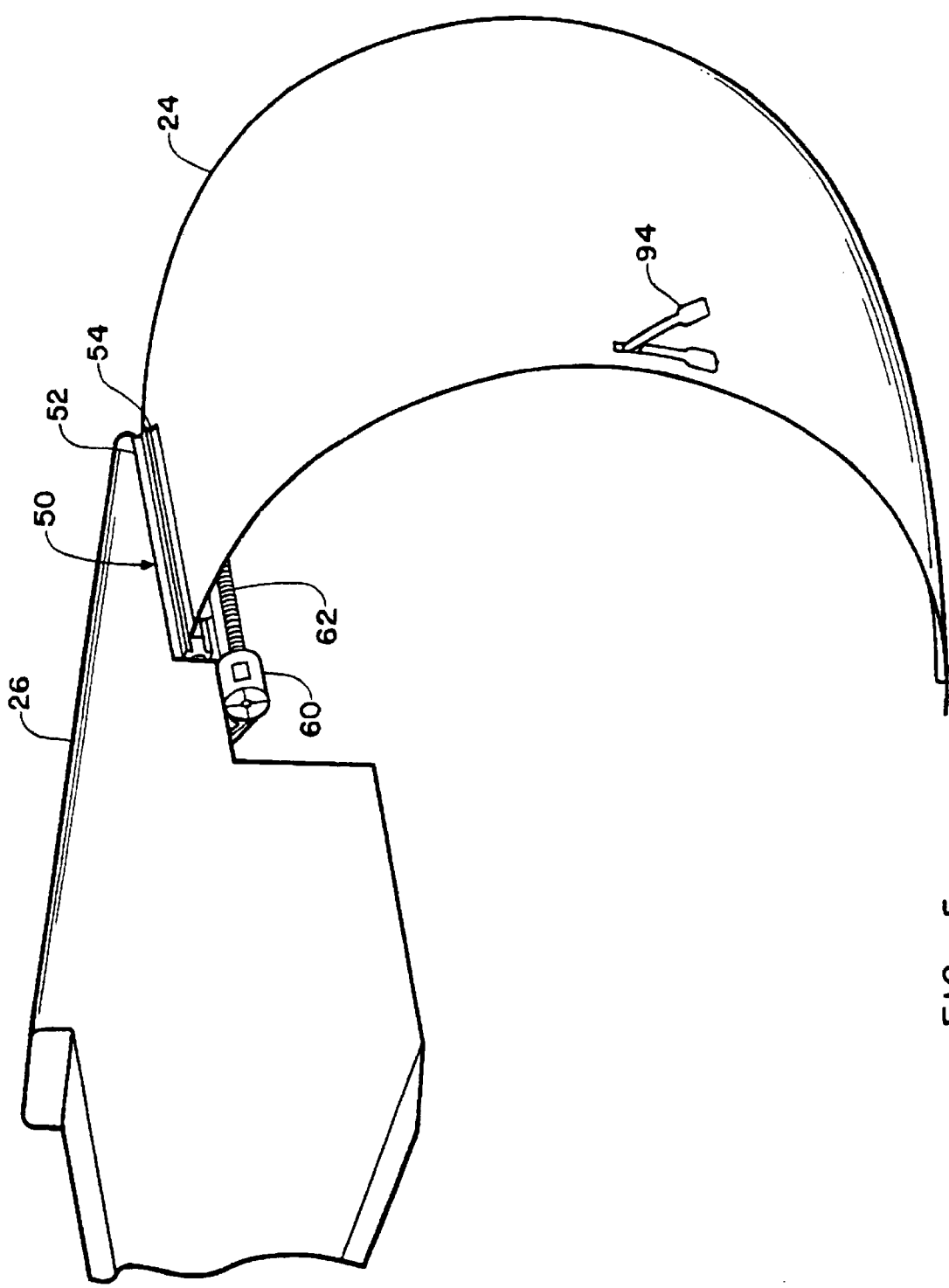
FIG. 5 is a simplified perspective illustrating the arrangement for translating the inlet cowl.
Figure 8:
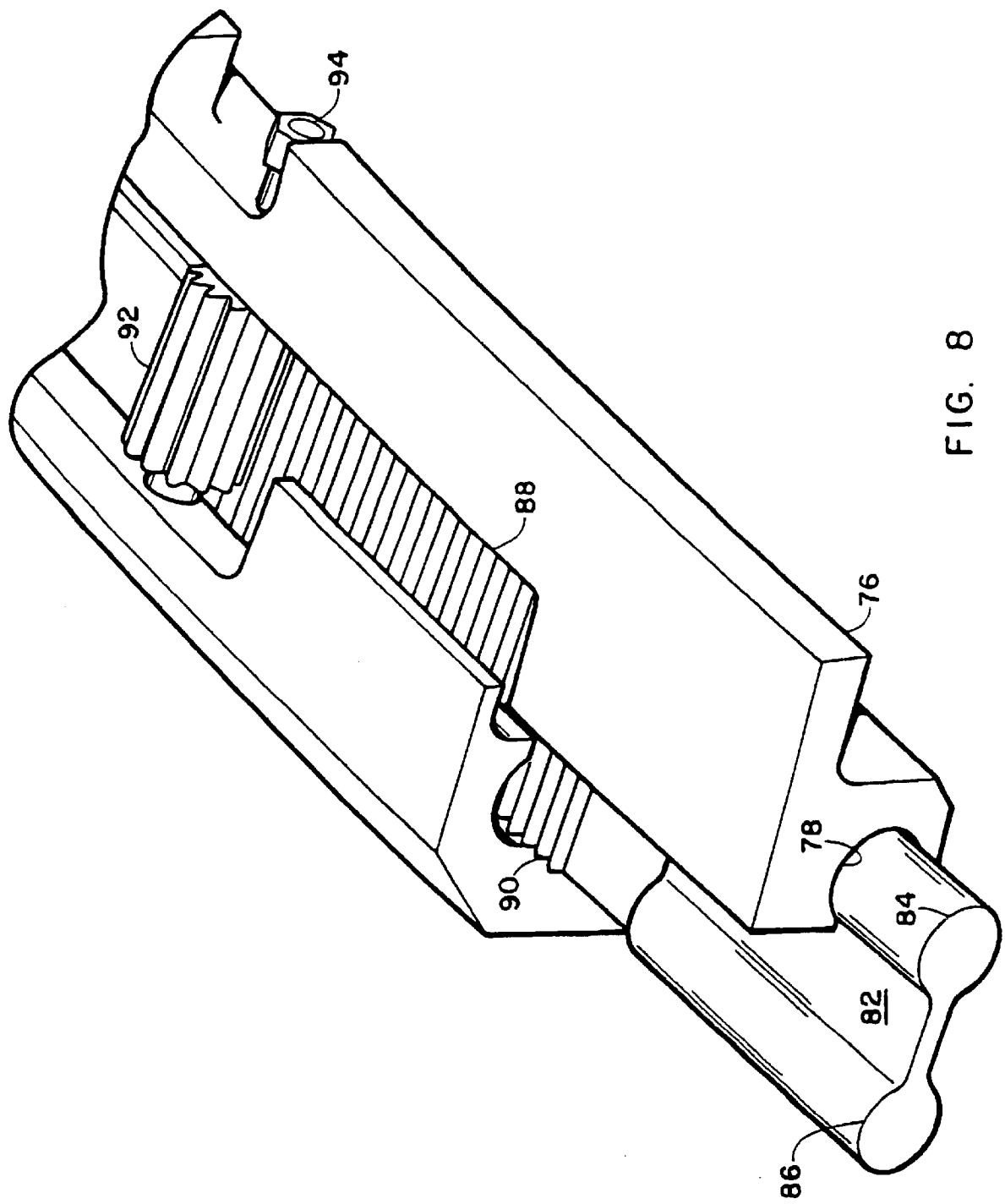
FIG. 8 is a simplified perspective illustrating the arrangement for rotating the locking ring of the locking mechanism of FIG. 7.

A suitable means is provided to determinably rotate the locking ring 82 between an unlocked position, as seen in FIG. 7, and a locked position. A preferred embodiment of this means is illustrated in FIG. 8 as a rack and pinion means wherein a rack portion 88 having a plurality of circumferentially arranged teeth 90, cooperates with a reversibly driving pinion gear 92 that is determinably driven in a desired rotation through shaft 94 to cause the locking ring 82 to be slidably positioned within the cavities 68 and 78 at a desired position. Referring now to FIG. 5, it will be seen that a suitable latch means 96 is coupled to the drive shaft 94 to rotate the rack portion 88 to a locking position wherein each bulbous portion 86 is slidably positioned within cavity 68 to ensure that the only time that the forward nacelle portion 24 may be translated forwardly is when the latch means 96 has been unlocked to rotate the pinion gear 92 to drive the cooperating rack portion 88 of the locking ring 82 to a position which will permit the bulbous portions 86 to be rotated from locking engagement with the locking member 66. While one latch means 96 has been shown in an unlocked position in FIG. 2, it should be recognized that a latch 96 and cooperating latching arrangement would commonly be provided for each half of a bifurcated rearward nacelle section 25.

It is also to be understood that the illustration of the preferred embodiment has been simplified and in many of the FIGURES various components of the nacelle system have been eliminated or shown only partially for ease of illustration.

The present disclosure includes that contained in the appended claims as well as that of the foregoing description. Although this invention has been described in its preferred forms with a certain degree of particularity, it is understood that the present disclosure of the preferred embodiment has been made only by way of example and numerous changes in the details of construction and combination and arrangement of parts and method steps may be resorted to without departing from the spirit and scope of the invention.

What is claimed is:

1. An aircraft propulsion system arrangement to determinably reduce or eliminate inlet cowl induced bending of an aircraft jet engine case during certain flight conditions, which arrangement comprises a turbofan aircraft jet engine having an engine case with a fan case portion, a nacelle structure housing the engine and having a forward generally cylindrical nacelle portion and a rearward nacelle portion, and a pylon structure to support the engine and the nacelle structure while permitting relative movement between the forward and rearward nacelle portions, wherein the pylon structure supports the forward nacelle portion independently of its support of the engine while permitting translational movement of the forward nacelle portion forwardly on the pylon structure from a locked operational position during operation of the engine to a forward servicing position during non-operation of the engine, wherein the forward nacelle portion provides an air inlet cowl portion directly coupled to said fan case portion of the engine for the supply of air to the engine and to an integral fan housing portion which surrounds the fan case portion of the engine, wherein the forward nacelle portion includes a noselip portion having an inner main skin which extends rearwardly to sealingly engage said fan case portion of the engine, and an outer generally concentric main skin which extends rearwardly to lockingly engage the rearward nacelle portion, and in the forward servicing position of the forward nacelle portion, it may be spaced forwardly from said fan case portion of the engine to uncover the outer fan case portion of the engine to give access thereto and to components mounted thereon which are inaccessible when the forward nacelle portion is secured in the operational position.

2. A nacelle arrangement according to claim 1 wherein the forward portion of the nacelle structure includes bulkhead means positioned between the inner and outer main skins to provide reinforcement.

3. A nacelle arrangement according to claim 2 wherein the bulkhead means includes at least two spaced bulkhead members fixedly positioned between said inner and outer main skins.

4. A nacelle arrangement according to claim 1 which further includes track means to provide support for the nacelle structure and to permit determinable translation of the forward nacelle structure portion from a locked operational position during operation of the engine to a forward servicing position.

5. A nacelle arrangement according to claim 4 wherein said track means is an extensible track arrangement cooperating with the supporting pylon structure and the supported nacelle structure to provide determinable translation of said forward nacelle structure portion.

6. A nacelle arrangement according to claim 5 which further includes screw jack means that is determinably actuable to extend and retract said track means to determinably translate said forward nacelle structure portion.

7. A nacelle arrangement according to claim 1 which further includes actuable locking means to provide locking of the aft end of said outer main skin to a forward flange means of said rearward nacelle portion.

8. A nacelle arrangement according to claim 7 wherein said locking means further includes latching means to provide determinable locking of said locking means, said latching means being accessible from a position external to the external main skin of the forward nacelle portion.

9. A nacelle arrangement according to claim 1 which further includes a seal means to provide a non-locking sealing and limited load transfer engagement between an aft end of the inner main skin of the forward nacelle portion and an annular flange provided on a forward portion of said fan case portion of said jet engine, said seal means comprising a V-groove arrangement that provides a generally concentrically shaped longitudinally extending V-shaped portion provided in the inner main skin that cooperates with a complementarily V-shaped portion of said flange of the fan case portion of said engine case.

10. A nacelle arrangement for a turbofan aircraft jet engine having an engine case and supported by a pylon structure secured to an aircraft to determinably reduce or eliminate inlet cowl induced engine case bending during certain flight conditions, which arrangement comprises a nacelle structure housing the engine and having a forward generally cylindrical nacelle portion supported on the pylon structure supporting the engine and a rearward nacelle portion supported on the engine case while permitting relative movement between the forward and rearward nacelle portions, wherein the forward nacelle portion is supported by the pylon structure in a manner to permit translational movement of the forward nacelle portion forwardly on the pylon structure from an operational position during operation of the engine to a forward servicing position during non-operation of the engine in which the forward nacelle portion is supported by the pylon structure forwardly of the operational position, wherein the forward nacelle portion provides an air inlet cowl portion directly coupled to a fan case portion of the engine case for the supply of air to the engine and a fan cowl housing portion which surrounds said fan case portion of the engine, wherein the forward nacelle portion includes a noselip portion having an inner main skin which extends rearwardly to engage the fan case portion of the engine case and an outer generally concentric main skin which extends rearwardly to lockingly engage the rearward nacelle portion, and in the forward servicing position of the forward nacelle portion it may be spaced forwardly of the air intake of the engine to uncover the outer fan case portion of the engine to give access thereto and to components mounted thereon which are inaccessible when the forward nacelle portion is secured in the operational position.

11. An aircraft propulsion system according to claim 10, wherein the forward nacelle portion has a substantially uninterrupted low drag exterior surface.

12. An aircraft propulsion system according to claim 10, wherein the support means provides for translational movement of the forward nacelle portion from its operational position to its forward servicing position.

13. An aircraft propulsion system according to claim 10 wherein the aft end of the forward nacelle portion terminates at a position downstream of the fan case of the jet engine.

14. An aircraft propulsion system according to claim 10 which also includes an extensible track means which provides support for the forward nacelle portion from the pylon structure and that permits determinable translational movement of the forward nacelle portion between an operational position and a servicing position.

15. An aircraft propulsion system according to claim 14 which further includes screw jack means to determinably translate the forward nacelle portion on said track means between an operational position and a servicing position.

16. An aircraft propulsion system for an aircraft to determinably reduce or eliminate inlet cowl induced engine case bending during certain flight conditions, which system comprises a nacelle structure housing a turbofan jet engine having an engine case and having a forward nacelle portion and a rearward nacelle portion, and a pylon structure to support independently the engine and the forward nacelle portion while permitting relative movement between the forward and rearward nacelle portions, wherein the pylon structure supports the forward nacelle portion while permitting translational movement of the forward nacelle portion forwardly on the pylon structure from an operational position during operation of the engine to a forward servicing position during non-operation of the engine in which the forward nacelle portion is supported by the pylon structure forwardly of the operational position, wherein the forward nacelle portion provides an air inlet portion directly coupled to a leading edge portion of a fan case portion of the engine case for the supply of air to the engine and a fan housing portion which surrounds said fan case portion of the engine case, wherein the forward nacelle portion includes a noselip portion having an inner main skin which extends rearwardly to engage the leading edge portion of a fan case portion of the engine case and an outer generally concentric main skin which extends rearwardly to lockingly engage the rearward nacelle portion, and in the forward servicing position of the forward nacelle portion it may be spaced forwardly of said fan case portion of the engine case to uncover the outer fan portion of the engine to give access thereto and to components mounted thereon which are inaccessible when the forward nacelle portion is secured in the operational position.

17. An aircraft propulsion system for an aircraft according to claim 16 which further includes an extensible track means which cooperates with the supporting pylon and the forward nacelle portion to provide fore and aft longitudinal translational movement of the forward nacelle portion between an operational positional and a servicing position, and screw jack means coupled to said track means to drive said extensible track means in a desired longitudinal direction.

18. An aircraft propulsion system for an aircraft according to claim 17 which further includes a locking ring means that is actuable by latch means accessible from the exterior of the forward nacelle portion to permit determinable locking of said aft end portion of the main skin portion of the forward nacelle portion to a forward flange of the rearward nacelle portion.

19. An aircraft propulsion system for an aircraft according to claim 18 wherein the rearward nacelle portion further comprises thrust reverser means for such system.

20. An aircraft propulsion system for an aircraft according to claim 16 which further includes seal means interposed between the aft end of the inner main skin of the forward nacelle portion and an annular flange of the leading edge portion of the fan case portion of the engine case to preclude the leakage of air flowing through said forward nacelle portion during operation of the engine between the non-locking engagement of the aft end said inner skin portion of the forward section of the nacelle portion and the fan case portion of the engine case.

21. An aircraft propulsion system for an aircraft according to claim 20 wherein said seal means provides a non-locking engagement of the aft end of said inner skin portion of the forward section of the nacelle portion and the fan case portion of the engine case, which non-locking engagement determinably falls within a range of complete elimination of bending load transfer from the forward nacelle portion to the fan case portion to a partial reduction in such bending load transfer.

22. An aircraft propulsion system for an aircraft according to claim 21 wherein the attachment of the forward nacelle portion to the rearward nacelle portion and the aircraft pylon is arranged to provide additional structural load paths for retention of said forward nacelle portion in said nacelle structure following a blade-out occurrence of the fan portion of the engine.

* * * * *

UNITED STATES PATENT AND TRADEMARK OFFICE
CERTIFICATE OF CORRECTION

PATENT NO.    : 6,340,135 B1
DATED         : January 22, 2002
INVENTOR(S)   : Barton It is certified that error appears in the above-identified patent and that said Letters Patent is hereby corrected as shown below:

<u>Title page,</u>
Item [*], Notice, delete phrase "by 0 days" and insert -- by 4 days --

Signed and Sealed this

Twenty-first Day of September, 2004

JON W. DUDAS
*Director of the United States Patent and Trademark Office*